(12) United States Patent
Ionele (10) Patent No.: US 10,516,319 B2
(45) Date of Patent: Dec. 24, 2019

(54) EXTERNAL FAN AND DRIVE END HOUSING FOR AN AIR COOLED ALTERNATOR

(71) Applicant: Dixie Electric Ltd., Concord (CA)

(72) Inventor: Bogdan Ionele, Thornhill (CA)

(73) Assignee: Dixie Electric Ltd., Concord, Ontario (CA)

( * ) Notice: Subject to any disclaimer, the term of this patent is extended or adjusted under 35 U.S.C. 154(b) by 81 days.

(21) Appl. No.: 15/472,482

(22) Filed: Mar. 29, 2017

(65) Prior Publication Data

US 2017/0288505 A1     Oct. 5, 2017

Related U.S. Application Data

(60) Provisional application No. 62/314,470, filed on Mar. 29, 2016.

(51) Int. Cl.
| | |
|---|---|
| *H02K 9/00* | (2006.01) |
| *H02K 9/06* | (2006.01) |
| *F04D 25/06* | (2006.01) |
| *F04D 29/28* | (2006.01) |
| *F04D 29/30* | (2006.01) |
| *F04D 29/58* | (2006.01) |
| *H02K 7/10* | (2006.01) |
| *H02K 5/20* | (2006.01) |
| *H02K 5/22* | (2006.01) |

(52) U.S. Cl.
CPC .............. *H02K 9/06* (2013.01); *F04D 25/06* (2013.01); *F04D 29/281* (2013.01); *F04D 29/30* (2013.01); *F04D 29/5806* (2013.01); *H02K 7/1004* (2013.01); *H02K 5/20* (2013.01); *H02K 5/225* (2013.01)

(58) Field of Classification Search
CPC . H02K 9/06; H02K 5/225; H02K 5/20; F04D 25/06; F04D 29/30
USPC .................... 310/52, 54, 58, 62, 64
See application file for complete search history.

(56) References Cited

U.S. PATENT DOCUMENTS

| | | | | |
|---|---|---|---|---|
| 4,588,911 A * | 5/1986 | Gold | ............. | H02K 13/02 310/194 |
| 6,586,853 B2 * | 7/2003 | Ishida | ............. | F04D 29/281 310/263 |
| 6,750,578 B2 * | 6/2004 | Buening | ............. | H02K 5/20 310/52 |
| 7,859,158 B2 * | 12/2010 | An | ............. | H02K 13/02 310/71 |
| 2003/0094865 A1 * | 5/2003 | Sugitani | ............. | H02K 5/20 310/58 |

* cited by examiner

*Primary Examiner* — Hanh N Nguyen

(74) *Attorney, Agent, or Firm* — Womble Bond Dickinson (US) LLP (57) ABSTRACT

An external centrifugal fan and drive end frame for use in an air cooled alternator are provided. Also provided is a vented pulley.

22 Claims, 14 Drawing Sheets

3D isometric view showing a typical alternator with the external fan mounted on the drive end (pulley end).

*-Figure 1-*

3D isometric view showing a typical alternator with the external fan mounted on the drive end.
-Fan and Drive End Housing are shown in a cross-sections view.
-Fan and Drive End Housing cross-sections are shown in red color -Figure 2-

3D isometric view showing the alternator with the new external fan mounted on the drive end (pulley end).

3D isometric view showing the new alternator with the external fan mounted on the drive end.
-Fan and Drive End Housing are shown in a cross-sections view.
-Fan and Drive End Housing cross-sections are shown in red color

EXTERNAL FAN AND DRIVE END HOUSING FOR AN AIR COOLED ALTERNATOR

CROSS-REFERENCE TO RELATED APPLICATIONS

This application claims priority to U.S. Appl. No. 62/314,470 filed on Mar. 29, 2016, which is incorporated herein by reference in its entirety and for all purposes.

FIELD OF THE INVENTION

This invention relates to an external fan and drive end housing for an air cooled alternator. In particular, this invention relates to a shaft mounted external aluminum alloy fan and drive-end housing used to cool a brushless alternator.

BACKGROUND OF THE INVENTION

Alternators convert mechanical rotational motion into electrical energy. In vehicles, such as cars and trucks, alternators are used to convert a portion of the power generated by the vehicle's internal combustion engine into electrical energy which is used to charge the vehicle's battery and power the vehicle's electrical systems. Depending on the application, the alternator has to reliably generate a significant amount of electrical power.

The alternator converts the input mechanical power applied at the rotor shaft into electrical DC output power. The conversion is less than perfect with losses occurring during the conversion process. The main losses are: joules winding losses that happen in the stator windings and the field coils, electromagnetic losses that occur in the stator stack and rotor claw pieces, electrical losses present in the rectifier assembly due to the voltage drop on the semiconductor material of the diodes, mechanical losses (bearings, alternator drive belt), ventilation (fan) losses, belt drive losses, etc. Typically, a claw type alternator has the efficiency within the 65% to 85% range. The remaining difference to 100% represent the above mentioned conversion losses that are ultimately present in the alternator as unwanted heat.

The conversion losses raise the temperature of critical components of the alternator to the point of reducing the reliability of the unit.

The common practice is to cool the brushless alternator through the use of one or two shaft mounted external fans (self ventilated/auto ventilated design).

The cooling fans are usually the radial type, also called centrifugal type and pull cooling air into the alternator. The air flows axially through the alternator and is expelled outside the unit by the fan. Along this cooling path, the air "picks-up" heat gradually becoming hotter and hotter, being its hottest when it exits the unit. A temperature map of the alternator reveals an uneven distribution of temperatures with the fan end region of the alternator running hotter relative to the opposite end by up to 35° C. Therefore special attention must be given to the drive end ball bearing(s) temperatures as they have been shown to run hotter by approximately up to 35° C. than the corresponding components from the other side (the bearing from the rectifier end). Moreover, the typical operating environment of an alternator is very warm—engine compartments with typical temperatures of in excess of 90° C. which further exacerbates the problem at the fan end (drive end) of the unit.

Standard practice is to use a light (low rotational inertia) aluminum alloy fan that can survive up to 200° C. temperatures—common at the fan end of the unit, without shape deformation or warping. Aluminum alloy is a highly conductive material and the overheated air received by the radial blades region "travels down" towards the fan center, overheating the fan hub which further transfers the unwanted heat to the front bearing(s). The diameter and width of the fan is limited by the volume available for the alternator. Therefore the limited size cooling fan needs to provide a high level of cooling power to the hot running components of the alternator on both fan side (drive end) and the opposite side (rectifier end). It is especially desirable to have an aluminum fan which more efficiently cools the drive end ball bearing(s), therefore keeping the mentioned component well under the safe operating temperatures.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide an external fan and drive end housing for an air cooled alternator. In accordance with an aspect of the invention, there is provided an alternator fan comprising a central hub connected by two or more ribs to a generally annular-shaped disc having a plurality of blades, wherein each blade of said plurality of blades extends from an inner edge of the annular-shaped disc to the peripheral edge.

In accordance with another aspect of the invention, there is provided an alternator drive end assembly comprising an alternator fan comprising a central hub connected by two or more ribs to a generally annular-shaped disc having a plurality of blades, wherein each blade of said plurality of blades extends from an inner edge of the annular-shaped disc to the peripheral edge, a drive end frame and pulley.

In accordance with some embodiments of the invention, the alternator drive end assembly includes a drive end frame comprising a fan mating surface. In accordance with another embodiment of the invention, the alternator drive assembly comprises a vented pulley.

BRIEF DESCRIPTION OF THE DRAWINGS

Embodiments of the invention will now be described, by way of example only, by reference to the attached Figures, wherein.

DETAILED DESCRIPTION OF THE INVENTION

Figure 1:
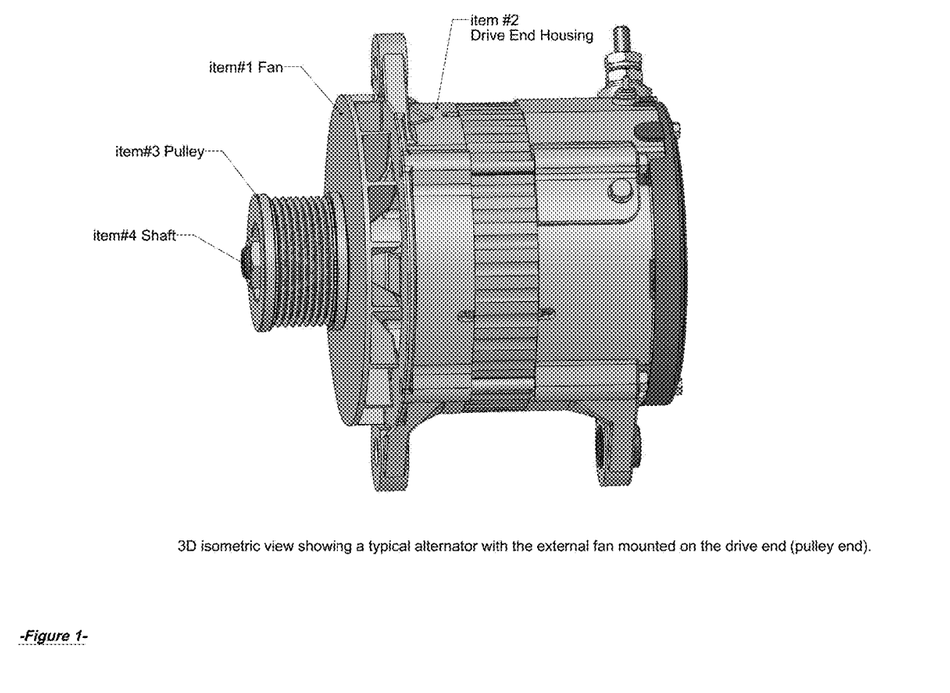
FIG. 1 illustrates a three-dimensional isometric view of a prior art design for a typical alternator with an external fan installed at the pulley end detailing fan (1), drive end housing (2), pulley (3), and shaft (4).
Figure 2:
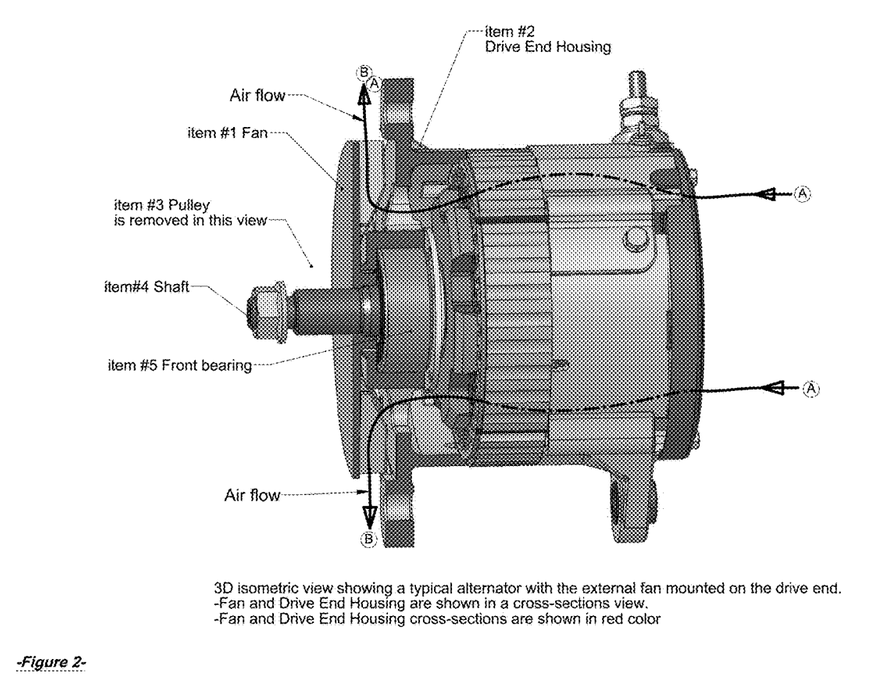
FIG. 2 illustrates a three-dimensional isometric cross section view of the fan and drive end housing of a prior art design for a typical alternator with an external fan installed at the pulley end detailing fan (1), drive end housing (2), pulley (3), shaft (4), and bearing (5). Also shown is airflow path.
Figure 3:
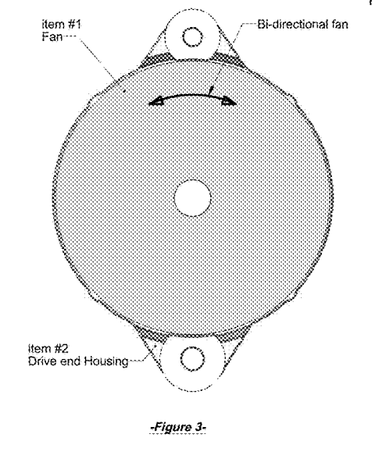
FIG. 3 illustrates a frontal view of a prior art design for a typical alternator external fan and the adjacent drive end housing aligned as in working/functional position detailing fan (1) and drive end housing (2).
Figure 4:
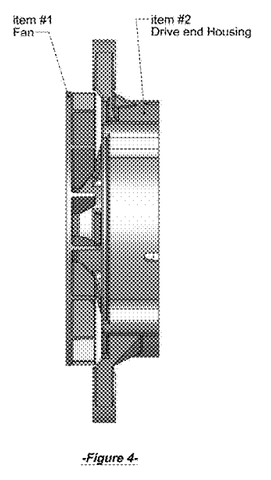
FIG. 4 illustrates a side view of a prior art design for a typical alternator external fan and the adjacent drive end housing aligned as in working/functional position detailing fan (1) and drive end housing (2).
Figure 5:
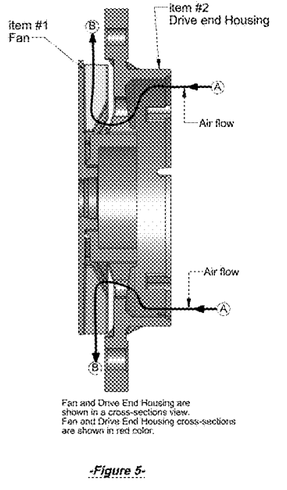
FIG. 5 illustrates a cross sectioned side view of a prior art design for a typical alternator external fan and the adjacent drive end housing aligned as in working/functional position. The fan (1) and drive end housing (2) are shown. Also shown is airflow path.
Figure 6:
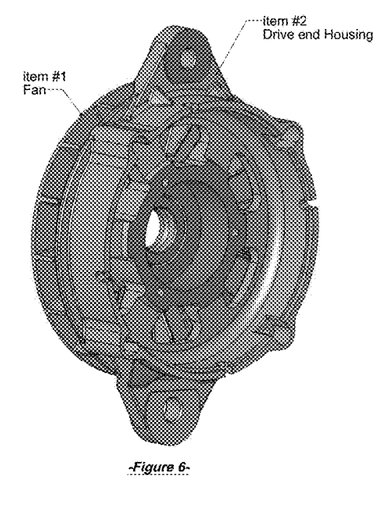
FIG. 6 illustrates a three-dimensional isometric top view of a prior art design for a typical alternator external fan and the adjacent drive end housing aligned as in working/functional position. The fan (1) and drive end housing (2) are shown.
Figure 7:
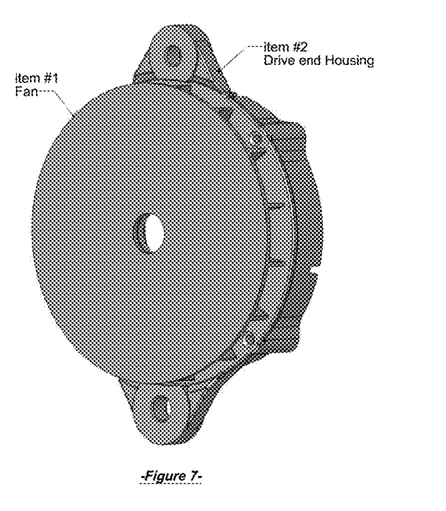
FIG. 7 illustrates a three-dimensional isometric bottom view of a prior art design for a typical alternator external fan and the adjacent drive end housing aligned as in working/functional position. The fan (1) and drive end housing (2) are shown.
Figure 8:
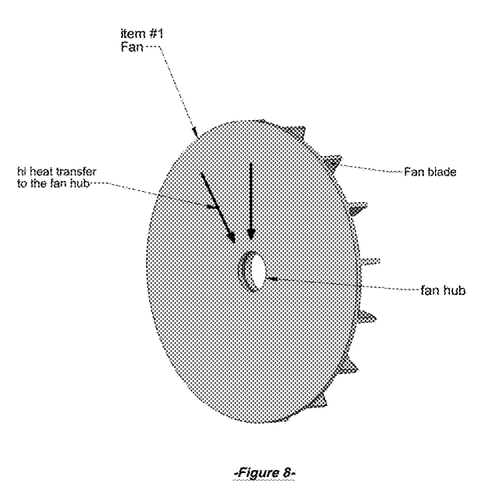
FIG. 8 illustrates a three-dimensional isometric bottom view of a prior art design for a typical alternator external radial fan. The fan (1) with fan blades and fan hub are shown. Also illustrated is high heat transfer to fan hub.
Figure 9:
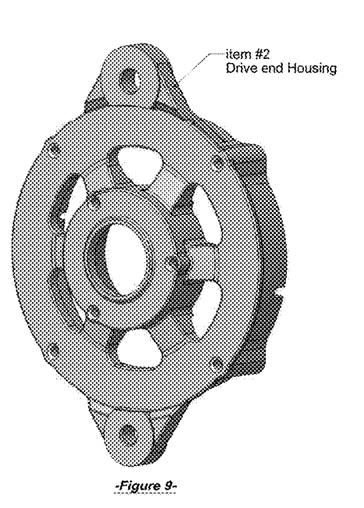
FIG. 9 illustrates a three-dimensional isometric bottom view of a prior art design for a typical alternator drive end housing (2).
Figure 10:
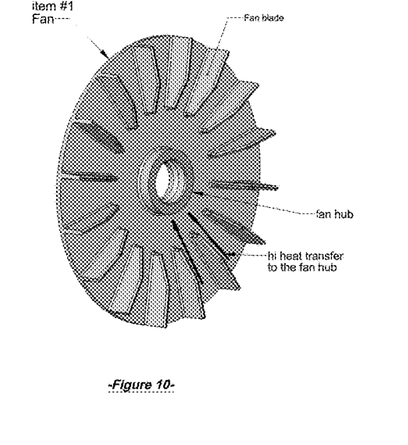
FIG. 10 illustrates a three-dimensional isometric top view of a prior art design for a typical alternator external radial. The fan (1) with fan blades and fan hub are shown. Also illustrated is high heat transfer to fan hub.
Figure 11:
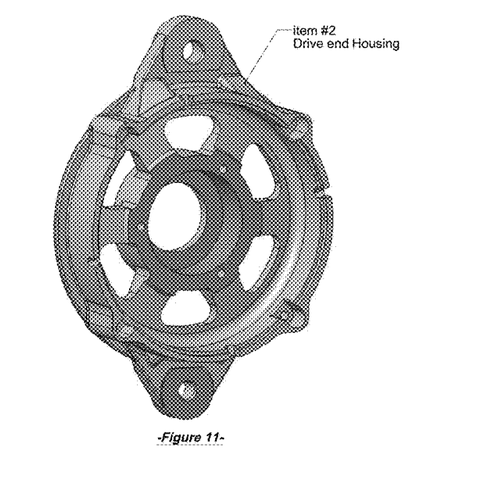
FIG. 11 illustrates a three-dimensional isometric top view of a prior art design for a typical alternator drive end housing (2).
Figure 12:
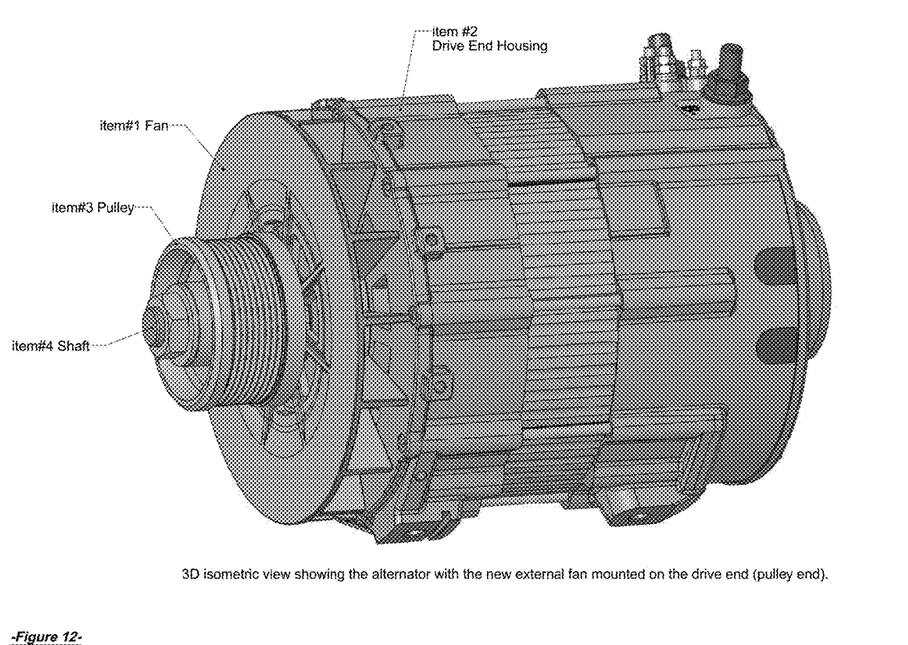
FIG. 12 illustrates a three-dimensional isometric view of an alternator with one embodiment of an external fan installed at its pulley end detailing fan (1), drive end housing (2), pulley (3), and shaft (4).

Referring to FIGS. 1 to 11, during operation of typical alternators, a fan (1) which is mounted on shaft (4) rotates relative to the fixed drive end housing (2). Cooling air is sucked from the back of the unit and expelled radially by the centrifugal fan as shown in FIG. 2 with typical airflow lines being from point "(A)" to point"(B)". During transit along the air flow path, the air is heated due to heat transfer from hot alternator internal parts such that the temperature of the air passing over the fan blade region is hot (the air path approaching point"(B)"). As a result, the fan blade region becomes overheated. Referring to FIGS. 8 and 10, heat is also transferred from the fan blades to the center of the fan, i.e. the fan hub. As the fan hub is in direct contact with shaft (4) and drive and bearing (5), the temperature of the drive end bearing (5) during operation is high (up to 180° C.). Repeated elevation of the drive end bearing temperature increases stresses on this component and thereby impacts overly reliability of the alternator. More effective cooling of the alternator drive end may therefore positively impact reliability of the alternator.

Referring to FIGS. 13 to 24, this invention provides an external fan and drive end housing for an air cooled alternator. The invention provides, a fan with a "ribbed" area having reduced connection to the fan hub for use with the drive end housing of the invention.

Figure 19:
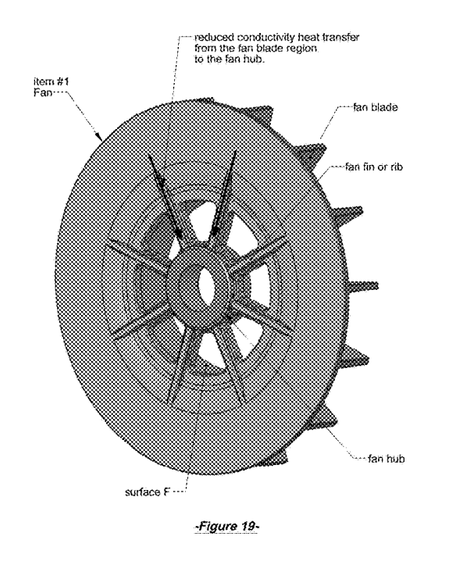
FIG. 19 illustrates a three-dimensional isometric bottom view of one embodiment of the alternator external radial fan. The fan (1) with fan blades, fan ribs, and fan hub are shown. Also illustrated is reduced conductivity heat transfer from the fan blade region to the fan hub.
Figures 21, 22:
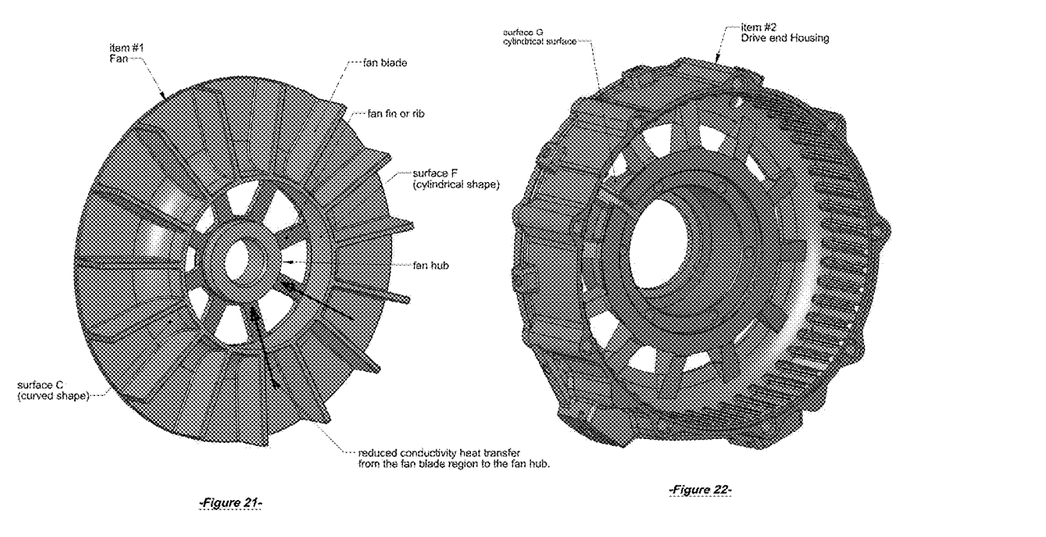
FIG. 21 illustrates a three-dimensional isometric top view of one embodiment of alternator external radial. The fan (1) with fan blades, fan ribs, and fan hub are shown. Also illustrated is reduced conductivity heat transfer from the fan blade region to the fan hub.
FIG. 22 illustrates a three-dimensional isometric top view of one embodiment of alternator drive end housing (2).

In one embodiment of the invention, the ribbed area of the fan is connected to the central hub via radial ribs therefore there is greatly reduced material connecting the fan hub to the main fan blade region as shown in FIGS. 19 and 21. The ribbed area of the fan is connected to the central hub via three or more ribs, four or more ribs, five or more ribs, six of more ribs, seven or more ribs, eight or more ribs. The ribs are optionally substantially evenly spaced. In some embodiments, the fan ribs are configured to limit or reduce heat transfer from the fan blade region to the central hub. Optionally, the fan ribs have a reduced cross section and optionally increased length to cut the conductive heat transfer from the hot running fan blades region to the center of the fan—the hub.

The parts of the fan or the whole fan can be made from a variety of materials known in the art. In some embodiments, it may be manufactured from molded plastic. In order embodiments it manufactured from aluminum, optionally aluminum injected material.

In some embodiments, the fan rib structure connecting the outer blade region to the fan hub consists of approximately one third of the material volume compared to the traditional non ribbed fan.

The fan ribbed structure is configured to prevent any rib shape deformation or cracking when alternator is working in the field. In some embodiments, a stiff fan hub structure is provided by an appropriate number of ribs: 2, 3, 4, 6, 8, etc. In some embodiments, the number of ribs increases with fan diameter. The rib cross section can be; rectangular shape, "T"-shape, or inclined "helical" shape, as well as other shapes that would be apparent to one of ordinary skill in the art.

Figure 20:
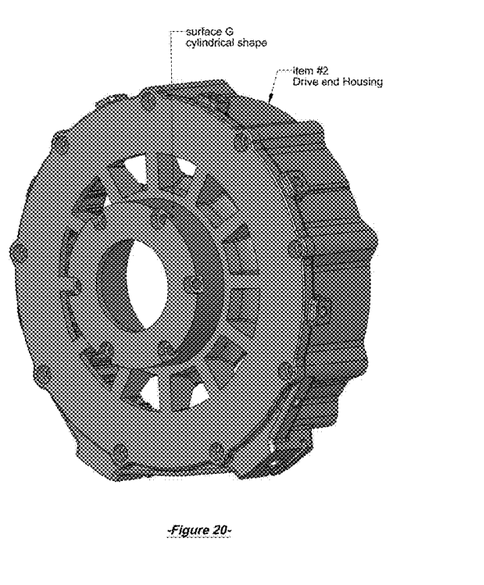
FIG. 20 illustrates a three-dimensional isometric bottom view of one embodiment of alternator drive end housing (2).

In some embodiments, the fan also features a curved or rounded embossment surface (see C in FIG. 21) and/or a new cylindrical surface or lip (see F in FIGS. 19 and 20). In some embodiments, the curved or rounded embossment surface "C" provides soother profile for better air flow.

In some embodiments, the cylindrical surfaces "F" and "G" form the "lip" assembly. In these embodiments, the "lip" assembly acts like a seal and prevents the air from the pulley side of the fan from being uncontrollably sucked inside the unit therefore bypassing the main air flow circuit. In other embodiments, alternative seals are provided. The "lip" assembly may be integral with the other components of the fan or formed separately.

Figure 13:
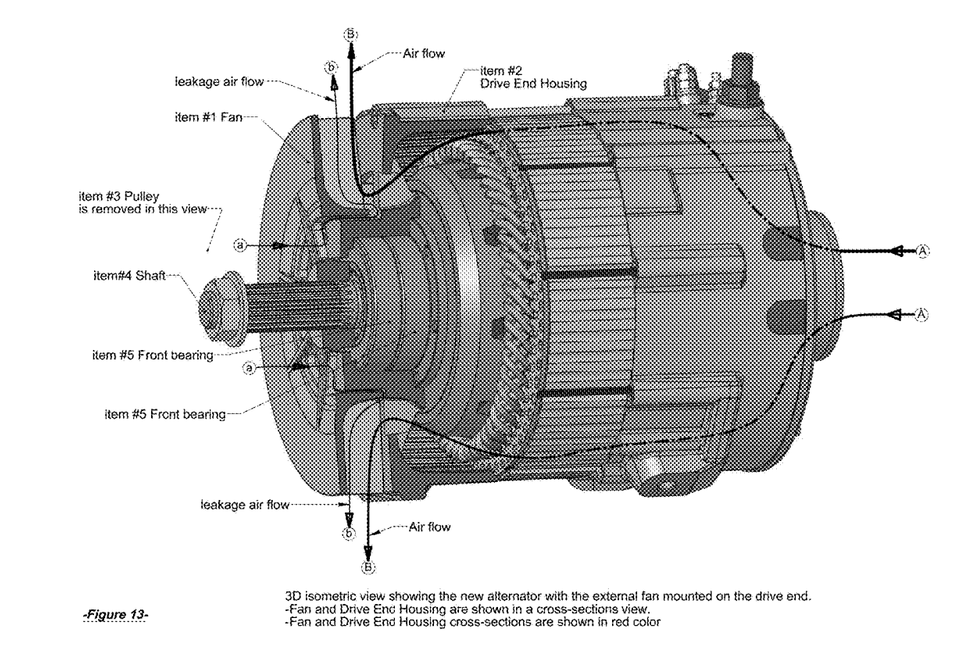
FIG. 13 illustrates a three-dimensional isometric, partial cut out view of an alternator with one embodiment of an external fan mounted on the drive end detailing fan (1), drive end housing (2), pulley (3), shaft (4), and bearing (5). Also shown is airflow path.
Figure 14:
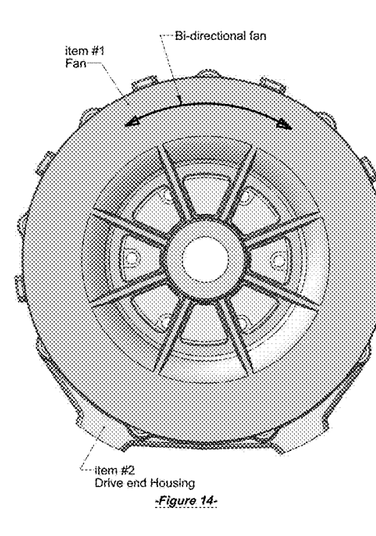
FIG. 14 illustrates a frontal view of one embodiment of the alternator external fan. The fan (1) and drive end housing (2) are shown.
Figures 15, 16:
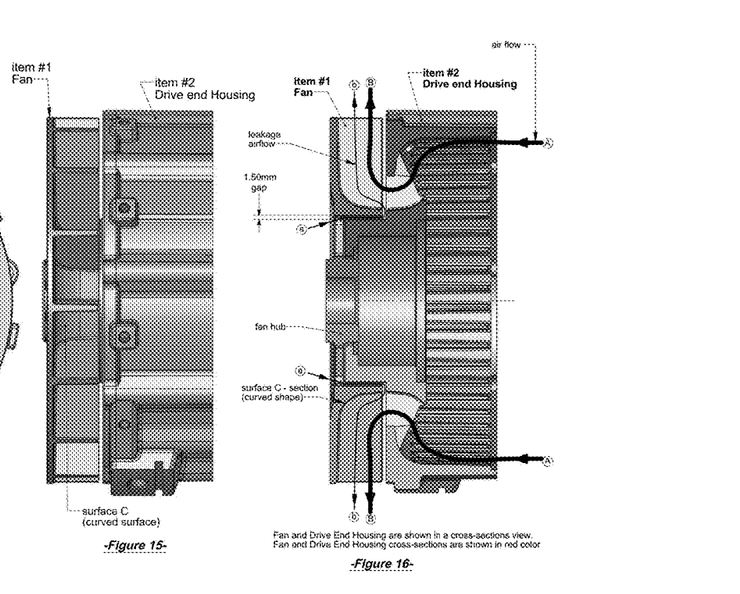
FIG. 15 illustrates a side view of one embodiment of the alternator external fan and the adjacent drive end housing aligned as in working/functional position. The fan (1) and drive end housing (2) are shown.
FIG. 16 illustrates a cross sectioned side view of one embodiment of the alternator external fan and the adjacent drive end housing aligned as in working/functional position. The fan (1) and drive end housing (2) are shown. Airflow path is also shown.
Figure 17:
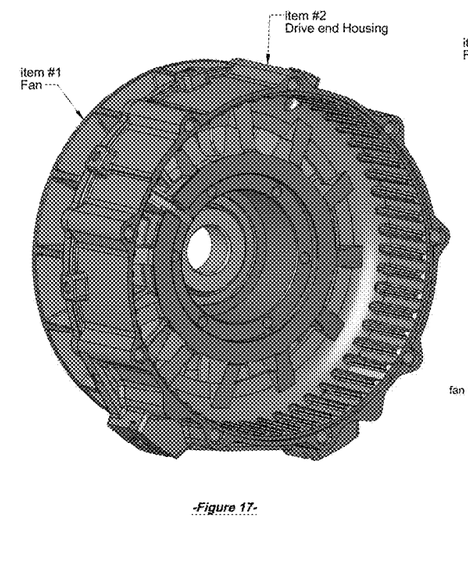
FIG. 17 illustrates a three-dimensional isometric top view of one embodiment of the alternator external fan and the adjacent drive end housing aligned as in working/functional position. The fan (1) and drive end housing (2) are shown.
Figure 18:
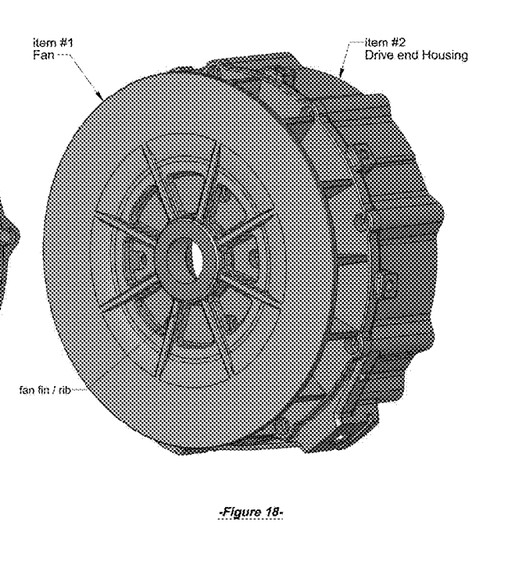
FIG. 18 illustrates a three-dimensional isometric bottom view of a prior art design for a typical alternator external fan and the adjacent drive end housing aligned as in working/functional position. The fan (1) and drive end housing (2) are shown. Fan ribs and blades are also shown.

The invention also provides a drive end frame comprising a fan mating surface which is the cylindrical surface G as seen in FIGS. 20 and 22. The drive end frame is configured such that the radial gap between the mating surfaces G and F is reduced. In some embodiments, the radial gap measures a controlled dimension of 1.5 mm as shown in FIG. 16. Referring to FIGS. 13 and 16, because of the reduced gap there is a "controlled" and also greatly reduced air leakage flow from the pulley end of the unit to the radial fan exit area where the typical air leakage path from point "(a)" to point"(b)" is marked with a smooth and thinner poly-line curve. The gap size controls the leakage air flow and therefore acts like a control "valve". In some embodiments, the lip gap is small, for example, about 0.5 mm. In other embodiments, the lip gap is larger, for example between about 1 and about 3 mm. In some embodiments, the gap size is about 1.5 mm.

Again because of the reduced cylindrical air gap between surface G and surface F, only a small "controlled" air leakage flow is allowed to be brought from the drive end side of the alternator into the fan blade area. The leakage airflow (path "(a)" to "(b)") joins the main airflow (path "(A)" to "(B)") and then the combined air flow is expelled outside the fan. This controlled air leakage flow cools two surfaces F and G which though conductivity cools the drive end bearing and other components. The main airflow is not influenced or reduced by the leakage air flow throughout the typical speed range of the fan (example 1800 rpm to 6500 rpm) as proven by the experiments The internal temperatures of the alternator are unaffected by the new ribbed fan and drive end housing combination but the temperature of the drive end bearing (5) is reduced by approximately 35° C. for the typical fan speed range of 1800 rpm to 6500 rpm. The unique cylindrical air gap sandwiched between surfaces F and G facilitates heat exchanger with passing leakage air cooling surfaces F and G. The cooling of surfaces F and G though conductivity contribute to cooling of the drive end bearing and other components.

Figures 23, 24:
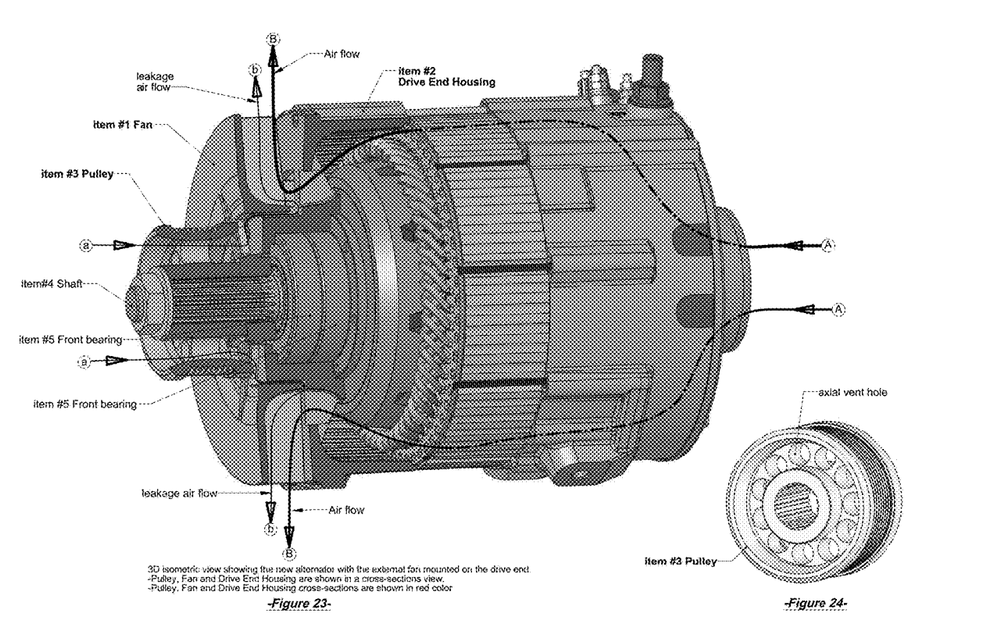
FIG. 23 illustrates a three-dimensional isometric, partial cut out view of an alternator with one embodiment of an external fan mounted on the drive end detailing combination of external fan alternator featuring a modified pulley detailing fan (1), drive end housing (2), pulley (3), shaft (4), and bearing (5). Also shown is airflow path.
FIG. 24 illustrates one embodiment of the modified pulley (3) detailing axial vent holes.

The invention further provides a vented pulley. Referring to FIG. 24, in some embodiments, the vented pulley comprises a plurality of axial vent holes.

Figure 25A:
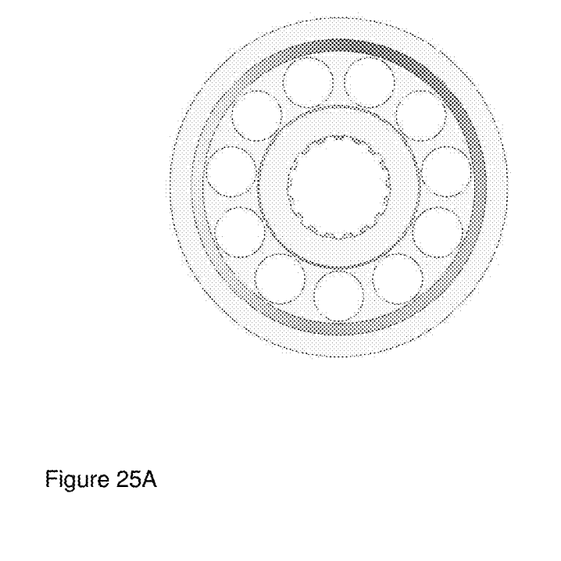
FIGS. 25A and 25B illustrate embodiments of the modified pulley.

Referring to FIG. 25A, in some embodiments the holes are straight and are optionally obtained by drilling straight cylindrical holes into the steel pulley body.

Figure 25B:
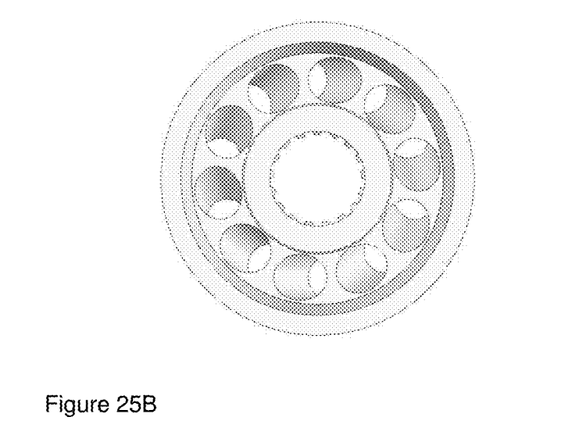

Referring to FIG. 25B, in some embodiments the holes are helical holes and optionally obtained by drilling inclined cylindrical holes into the steel pulley body. In some embodiments, this provides for increased airflow depending on the shaft rotation CCW or CCW, etc.

In some embodiments, the ribbed fan, drive end housing with fan mating surface are used with the vented pulley that features axial vent holes. In such embodiments, the leakage air flow can be lengthened as shown in FIG. 23 (air leakage path "(a)" to "(b)") such that the pulley is air cooled and therefore the belt that is driving the pulley will run cooler and last longer.

To gain a better understanding of the invention described herein, the following examples are set forth. It will be understood that these examples are intended to describe illustrative embodiments of the invention and are not intended to limit the scope of the invention in any way.

EXAMPLE

Experimental Data:
Tests done at 93° C. ambient temperature, full alternator output:
Prior Art Fan and Drive End (DE) Frame

| Rotor Speed (rpm) | DE bearing temp. (° C.) | Ref. stator temperature (° C.) |
|---|---|---|
| 1800 | 140 | 160 |
| 2000 | 141 | 162 |
| 3000 | 157 | 175 |
| 4000 | 175 | 180 |
| 5000 | 180 | 175 |
| 6000 | 180 | 170 |
| 6500 | 178 | 168 |

Ribbed Fan and DE Frame (1.5 mm Lip Gap)

| Rotor speed (rpm) | DE bearing temp. (° C.) | Ref. stator temperature (° C.) |
|---|---|---|
| 1800 | 130 | 160 |
| 2000 | 131 | 162 |
| 3000 | 139 | 175 |
| 4000 | 145 | 180 |
| 5000 | 150 | 175 |
| 6000 | 147 | 170 |
| 6500 | 143 | 168 |

Various embodiments of the present invention having been thus described in detail by way of example, it will be apparent to those skilled in the art that variations and modifications may be made without departing from the invention. The invention includes all such variations and modifications as fall within the scope of the appended claims.

I claim:
1. An external alternator fan comprising a central hub connected by two or more ribs to a single annular-shaped disc having a plurality of blades, wherein the annular-shaped disc has an inner edge and a peripheral edge and wherein each blade of said plurality of blades extends from the inner edge of the annular-shaped disc to the peripheral edge of the annular-shaped disc.

2. The alternator fan of claim 1, wherein the inner edge of the annular-shaped disc comprises a lip.

3. The alternator fan of claim 1, wherein the lip comprises a curved surface.

4. An alternator drive end assembly comprising the alternator fan of claim 3, a drive end frame and pulley.

5. The alternator drive end assembly of claim 4, wherein the drive end frame comprises a fan mating surface.

6. The alternator drive end assembly of claim 4, wherein the drive end frame is configured to engage the fan such that air leakage is minimized and/or controlled.

7. The alternator drive end assembly of claim 4, wherein the pulley is a vented pulley.

8. The alternator drive end assembly of claim 7, wherein the vented pulley comprises a plurality of axial vent holes.

9. The alternator drive end assembly of claim 8, wherein the vent holes are straight.

10. The alternator drive end assembly of claim 9, wherein the vent holes are helical.

11. An electric motor comprising the alternator drive end assembly of claim 4.

12. An alternator comprising the alternator drive end assembly of claim 4.

13. The alternator fan of claim 2, wherein the lip and each blade are the same height.

14. The alternator fan of claim 1, comprising three or more ribs.

15. The alternator fan of claim 1, comprising four or more ribs.

16. The alternator fan of claim 1, comprising five or more ribs.

17. The alternator fan of claim 1, comprising six of more ribs.

18. The alternator fan of claim 1, comprising seven or more ribs.

19. The alternator fan of claim 1, comprising eight or more ribs.

20. The alternator fan of claim 1, wherein the ribs are substantially evenly spaced.

21. The alternator fan of claim 1, wherein the alternator fan is manufactured from aluminum alloy.

22. The alternator fan of claim 1, wherein the alternator fan is cast as a single piece.

* * * * *